United States Patent

Waxler et al.

[11] Patent Number: 6,012,447
[45] Date of Patent: Jan. 11, 2000

[54] HEATED MIXING KETTLE WITH DUAL ACTING AGITATORS

[75] Inventors: Thomas M. Waxler, Douglasville; Russell W. Clark, Fayetteville, both of Ga.

[73] Assignee: Stimsonite Corporation, Niles, Ill.

[21] Appl. No.: 09/124,446

[22] Filed: Jul. 29, 1998

[51] Int. Cl.[7] .............................. E01C 19/45; B28C 5/08; C08F 5/02; D06F 15/00; A23L 37/10
[52] U.S. Cl. ......................... 126/343.5 R; 126/343.5 A; 126/373; 126/387; 126/284; 126/345; 99/348; 366/64; 366/65; 366/241; 366/293; 366/295; 366/320; 366/327.1; 366/327.3; 366/327.4; 366/325.7; 366/605; 422/135; 68/132; 68/134; 68/136
[58] Field of Search ..................... 126/373, 387, 126/345, 343.5 R, 343.5 A, 284, 350 C, 344; 366/64, 65, 241, 149, 293, 295, 320, 321, 327.1, 327.3, 327.4, 310, 325.7, 605; 99/348; 68/132, 134, 136; 422/135

[56] References Cited

U.S. PATENT DOCUMENTS

| 925,744 | 6/1909 | Blystone | 366/64 |
|---|---|---|---|
| 1,478,073 | 12/1923 | Van Kuren | 366/296 |
| 1,612,281 | 12/1926 | Goetz | 366/244 |
| 1,734,632 | 11/1929 | Merrill | 366/320 |
| 1,770,459 | 7/1930 | Child | 366/296 |
| 1,997,035 | 4/1935 | Arbuckle | 366/296 |
| 2,064,131 | 12/1936 | Tuscan et al. | 366/293 |
| 2,509,543 | 5/1950 | Truax | 366/320 |
| 2,784,950 | 3/1957 | Bakewell | 366/296 |
| 3,104,869 | 9/1963 | August et al. | 366/64 |
| 3,334,575 | 8/1967 | Erwin | 99/348 |
| 4,395,133 | 7/1983 | Clevenholm et al. | 99/348 |
| 4,509,860 | 4/1985 | Lasar, III | 366/296 |
| 4,900,158 | 2/1990 | Ugolini | 366/295 |
| 5,102,229 | 4/1992 | Wada et al. | 366/294 |
| 5,152,971 | 10/1992 | Bertrand et al. | 366/320 |
| 5,518,312 | 5/1996 | Inoue et al. | 366/293 |
| 5,603,568 | 2/1997 | Mobley et al. | 366/196 |
| 5,802,961 | 9/1998 | Hay et al. | 366/149 |
| 5,876,117 | 3/1999 | Chen | 366/320 |

*Primary Examiner*—Ira S. Lazarus
*Assistant Examiner*—David Lee
*Attorney, Agent, or Firm*—Jones, Day, Reavis & Pogue

[57] ABSTRACT

A heated kettle for melting and mixing a thermoplastic resin into a homogeneous mixture has a helically-formed agitator which rotates about a central shaft in close proximity to the internal wall of the kettle. Fixed to the shaft at approximately the center of the kettle is a cluster of radially extending paddles. The paddles and agitator have opposite pitch when the agitator and paddles are rotated, the resin circulates along the wall of the kettle and thence through a central region of the kettle. The circulation action serves to thoroughly melt and mix the resin into a homogeneous liquid mass.

7 Claims, 1 Drawing Sheet

HEATED MIXING KETTLE WITH DUAL ACTING AGITATORS

BACKGROUND OF THE INVENTION

1. Field of the Invention

The present invention relates generally to a kettle for mixing material using dual acting agitators and, more particularly, to a kettle which is heated and is capable of mixing meltable material and maintaining the material in a homogenous liquid state.

2. Description of the Related Art

Numerous devices are known for mixing material such as liquid chemicals and powdered or granular material. Often such devices include a vat in some form which is provided with one or more rotatable agitators to mix the contents of the vat into a homogeneous state. The agitators may include motor-driven paddle devices.

It is particularly important in the roadway pavement striping industry, for example, that the striping material be thoroughly and homogeneously mixed before it is applied to the pavement. In recent times it has become generally accepted to use a material for striping pavement having a thermoplastic resin as a main constituent. Such resin is available in powered form and must be heated to its liquid transition temperature before it can be applied. The mixing may be performed in batches in a heated kettle. However, the complete, homogeneous mixing of the powdered resin as it is melting into liquid form is essential to obtain an acceptable product.

SUMMARY OF THE INVENTION

The present invention improves over the prior art by providing a heated kettle for melting and mixing a thermoplastic resin into a homogeneous mixture in which a helically-formed agitator rotates about a central shaft in close proximity to the internal wall of the kettle. Fixed to the shaft at approximately the center of the kettle is a cluster of radially extending paddles. The paddles and agitator have opposite pitch when the agitator and paddles are rotated, the resin circulates along the wall of the kettle and thence through a central region of the kettle. The circulation action serves to thoroughly melt and mix the resin into a homogeneous liquid mass.

BRIEF DESCRIPTION OF THE DRAWINGS

The foregoing and other novel improvements and advantages of the invention will be better understood upon a reading of the following detailed description taken in conjunction with the accompanying drawings wherein.

DETAILED DESCRIPTION OF THE PREFERRED EMBODIMENTS

Figure 1:
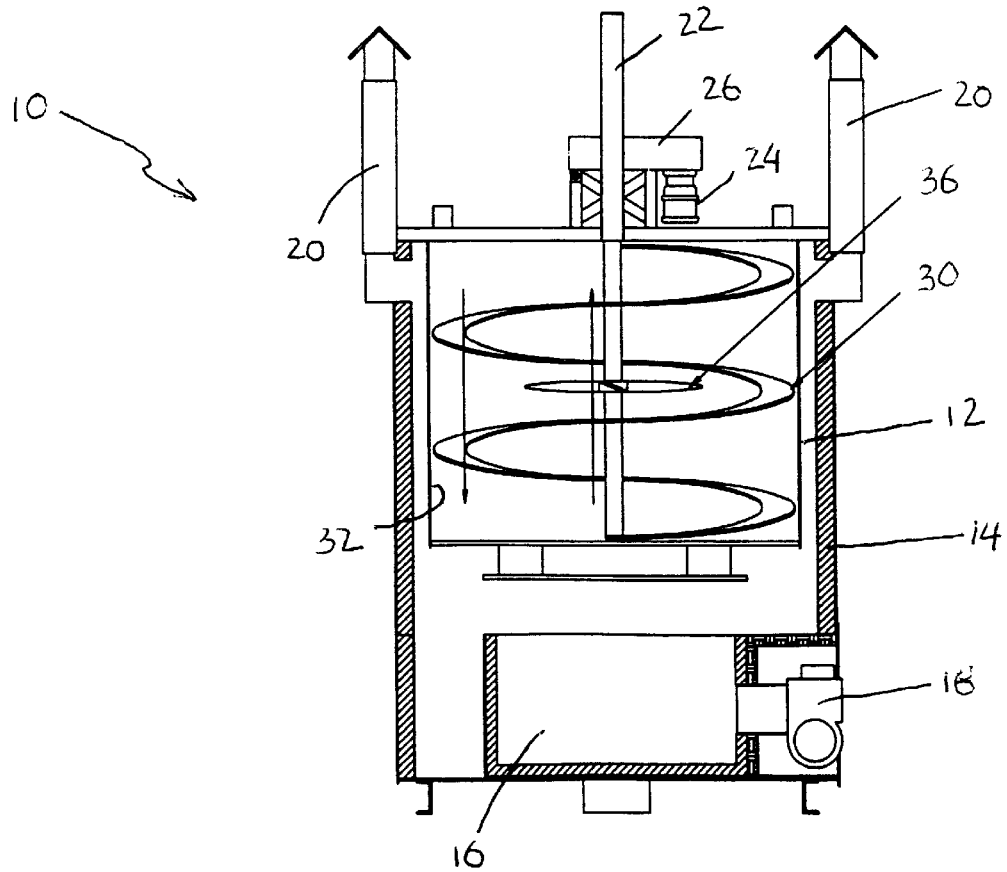
FIG. 1 is a side schematic view of a material melting and mixing device constructed in accordance with the principles of the invention.
Figure 2:
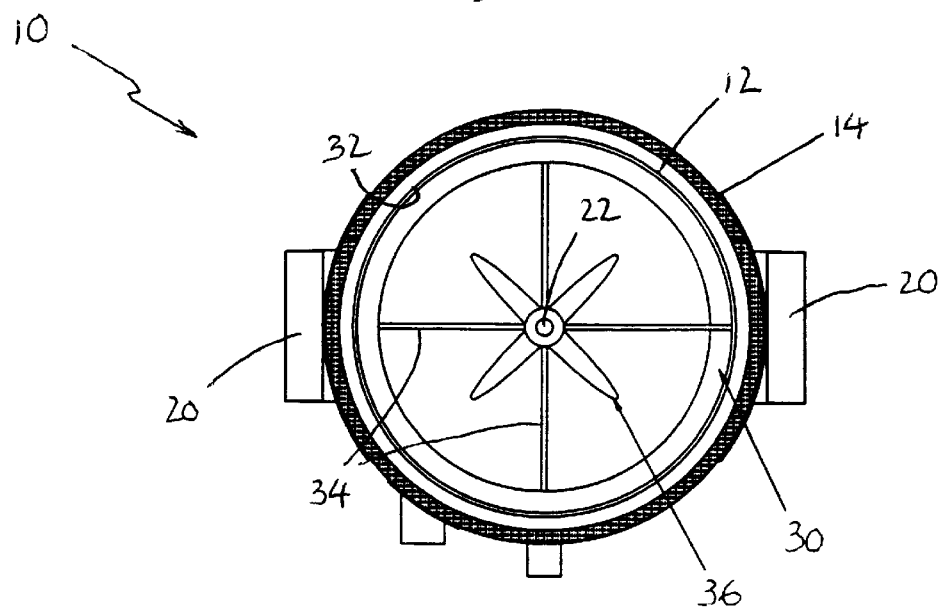
FIG. 2 is a top schematic view thereof

Referring now to the drawings, a combined mixing and material melting device constructed in accordance with the invention is designated generally by the reference number 10. The device 10 includes as a principal component a generally cylindrical kettle 12 fitted within a heat insulated enclosure 14. The Enclosure 14 is provided with a firebox 16 disposed directly beneath the kettle 12. An oil burner 18 may provided to inject a flame into the fire box 16 to heat the kettle 12 and its contents. Although an oil burner 18 is preferred in some applications, it can be appreciated that in other applications the kettle 12 can be heated by electric resistance means, or natural or LP gas, for example. The enclosure 14 is preferably vented to the atmosphere by stacks 20 thereby eliminating combustion by-products from the firebox 16.

Supported for rotation by suitable bearings (not shown) and positioned along the central longitudinal axis of the kettle 12 is a shaft 22. The shaft 22 is rotated by an hydraulic motor 24 coupled to a suitable gear reduction drive assembly 26. Fixed to the shaft 22 at its upper and lower ends is a helically-formed continuous agitator 30. The agitator 30 is dimensioned and configured as to be disposed throughout its length in close proximity to internal wall 32 of the kettle 12, for purposes which will be described hereinafter. Suitable struts 34 may be used to attach the agitator 30 to the shaft 22.

Positioned centrally of the kettle 12 and extending radially outwardly from the shaft 22 are a plurality of paddles 36 arranged in a cluster. Although four paddles 36 have been shown as preferred, other numbers of paddles may be desirable depending upon the viscosity of the material being mixed. We have found that four paddles 36 perform most adequately for mixing thermoplastic resin of a type suitable for pavement striping material. In accordance with the invention the paddles 36 have a pitch which is opposite the pitch of the agitator 30.

It can now be appreciated that the device 10 according to the invention provides a highly functional means for melting thermoplastic resin powder and mixing the melted powder into a homogeneous liquid mass. The position of the agitator 30 in close proximity to the internal wall 32 of the kettle 12 causes a wiping action which ensures that the material within the kettle is thoroughly mixed. The material thereby circulates continuously along the kettle wall 32 and thence through the central region of the kettle 12. In preferred form, the pitch of the agitator 30 and paddles 36 and the direction of rotation of the associated shaft 22 is such that the material is forced downwardly along the wall 32 and upwardly through the center of the kettle 12. However, the action can be reversed and the device 10 will perform acceptably.

While the present invention has been described in connection with preferred embodiments thereof, it will be apparent to those skilled in the art that many changes and modifications may be made without departing from the true spirit and scope of the invention. Accordingly, it is intended by the appended claims to cover all such changes and modifications as come within the spirit and scope of the invention

What is claimed is:

1. Apparatus for melting and mixing a solid material into a homogenous molten state comprising:
    a kettle having a generally cylindrical internal wall defining a central longitudinal axis;
    a source of heating including a burner assembly and fire box disposed beneath said kettle for heating said kettle;
    a helically-formed agitator supported for rotation in close proximity to said internal wall of said kettle;
    a rotatable shaft supporting opposed ends of said helically-formed agitator, said shaft extending generally along the central axis of said internal wall;
    a plurality of paddles supported by said shaft and extending radially outwardly therefrom with distal ends being spaced from said helically-formed agitator;
    said paddles and said helically formed agitator having opposed pitches;

wherein said solid material is continuously and homogeneously mixed into a molten state upon heating of said kettle and rotation of said shaft by causing said material to circulate along the internal wall of the kettle and thence through a central region of the kettle under the action of the agitator and paddles.

2. The apparatus of claim 1 wherein said material comprises a thermoplastic resin.

3. The apparatus of claim 1 wherein said burner assembly is oil burning.

4. The apparatus of claim 1 including at least one exhaust stack extending along a side of said kettle for exhausting said firebox of combustion by-products.

5. A device for melting a material comprising thermoplastic resin and mixing said material into a homogeneous molten state, the device comprising:

a generally cylindrical kettle having an internal wall defining a central longitudinal axis;

a rotatable shaft extending along said axis and having fixed at opposed ends thereof a helically-formed agitator, said agitator being disposed in close proximity to said wall;

a burner assembly and firebox disposed beneath said kettle for heating said material in said kettle;

a cluster of paddles extending radially outwardly of said shaft and spaced form said agitator, said paddles being disposed approximately centrally of said kettle and having a pitch which is opposite the pitch of said agitator;

wherein said material is placed into said kettle in powered form and is heated to a molten homogeneous state as it circulates along the internal wall of the kettle and thence through a central region of the kettle under rotating action of the agitator and paddles.

6. A method for melting a thermoplastic composition from a solid state to a liquid state and mixing said composition into a homogeneous liquid mass, comprising the steps of:

providing a heated kettle having a generally cylindrical internal wall defining a central longitudinal axis;

providing a rotatable shaft along said longitudinal axis, said shaft having fixed thereto a helically-shaped agitator disposed in close proximity to said internal wall and a cluster of radially extending paddles disposed approximately centrally of said kettle and spaced from said agitator, said agitator and said paddles having opposite pitch;

placing a quantity of said composition in a solid state in said kettle; and rotating said shaft;

wherein said composition is melted becoming a homogeneous liquid mass as it circulates along said internal wall and thence through a central region of the kettle under rotating action of the agitator and paddles.

7. Apparatus for melting and mixing a solid material into a homogenous molten state comprising:

a kettle having a generally cylindrical internal wall defining a central longitudinal axis;

a source of heat for heating said kettle;

a helically-formed agitator supported for rotation in close proximity to said internal wall of said kettle;

a rotatable shaft supporting opposed ends of said helically-formed agitator, said shaft extending generally along the central axis of said internal wall;

a plurality of paddles supported by said shaft and extending radially outwardly therefrom with distal ends being spaced from said helically-formed agitator, and being disposed in a single cluster positioned substantially centrally of said longitudinal axis;

said paddles and said helically formed agitator having opposite pitches;

wherein said solid material is continuously and homogeneously mixed into a molten state upon heating of said kettle and rotation of said shaft by causing said material to circulate along the internal wall of the kettle and thence through a central region of the kettle under the action of the agitator and paddles.

* * * * *